Oct. 18, 1949.  R. J. HALLISY  2,485,049
HOSE COUPLING

Filed Sept. 6, 1945  2 Sheets-Sheet 1

INVENTOR
RAYMOND J. HALLISY

BY *Arthur R. Woolfolk*

ATTORNEY

Oct. 18, 1949.  R. J. HALLISY  2,485,049
HOSE COUPLING
Filed Sept. 6, 1945  2 Sheets-Sheet 2
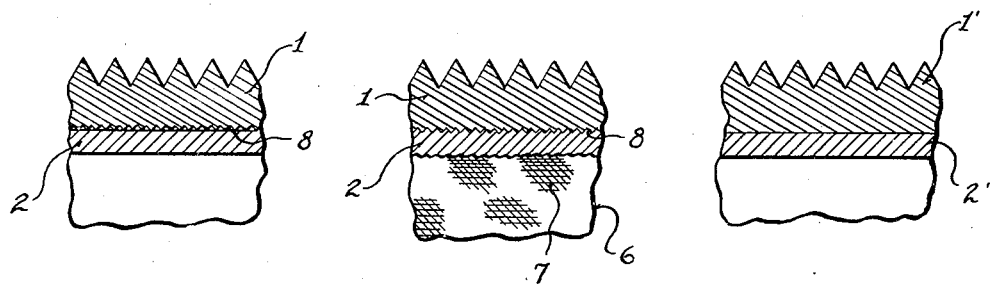
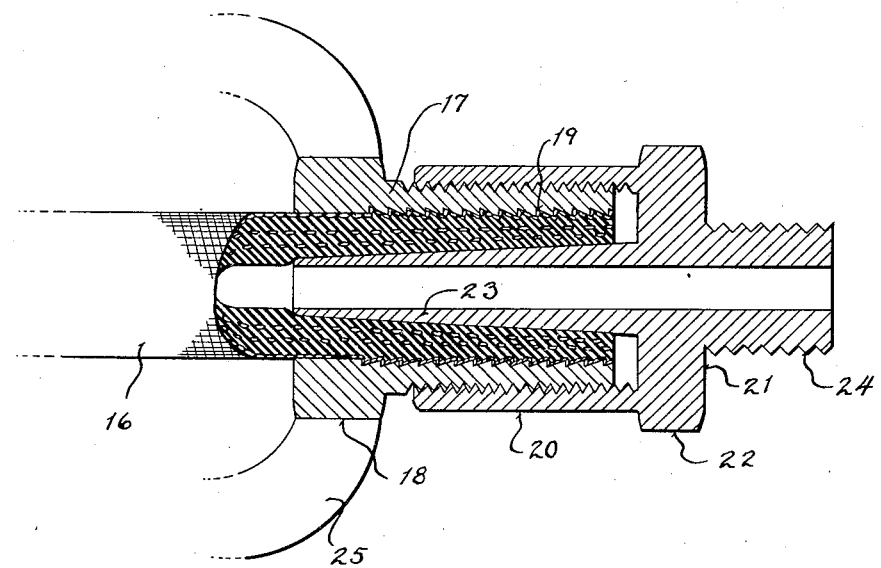
INVENTOR
RAYMOND J. HALLISY
BY
ATTORNEY Patented Oct. 18, 1949

2,485,049

UNITED STATES PATENT OFFICE 2,485,049

HOSE COUPLING

Raymond J. Hallisy, Manitowoc, Wis., assignor to Eastman Mfg. Company, Manitowoc, Wis.

Application September 6, 1945, Serial No. 614,697

2 Claims. (Cl. 285—84)

This invention relates to hose couplings and is particularly directed to renewable hose couplings.

In renewable hose couplings as heretofore constructed, it has been the usual practice to provide a deformable ring which surrounded the outer portion of the hose or which surrounded the braided wire reinforcing of the hose and which was deformed when a sleeve was screwed onto a shell and in which an annularly ribbed or fluted or barbed nipple was carried by the shell and was arranged for insertion into the bore of the hose prior to screwing the sleeve in place.

It has been found that the annularly fluted or barbed insert frequently damaged the inner lining of the hose, and also the deformable ring frequently cut too deeply into the body of the hose and, in addition, could not be used again when the coupling was opened up.

This invention is designed to overcome the above noted defects and objects of this invention are to provide a novel form of renewable hose coupling in which no deformable ring is employed, in which the nipple which enters the hose is smooth and does not damage the inner lining of the hose, and in which the nipple is tapered and expands the hose into binding engagement with the sleeve, the sleeve serving to draw the hose into the shell and over the nipple when the shell is screwed onto the sleeve while the sleeve and hose are held stationary.

Further objects are to provide a renewable coupling in which no portion is damaged in use but which may be used over again as often as desired, and which is so made that it may be tightened up while in use with ordinary wrenches without requiring any special tools.

A further specific object of this invention is to provide a hose coupling in which an inner sleeve of soft material is located in the main sleeve and is arranged to engage the reinforcing wire braiding of a hose and to shape itself to this wire braiding and, if desired, to shape itself to the roughened or threaded interior of the main sleeve when the shell is screwed onto the main sleeve, the invention also contemplating the initial pressing of the soft inner sleeve into the main sleeve if so desired.

Further objects are to provide a renewable hose coupling which is simple in construction and which is easy to make and apply.

Embodiments of the invention are shown in the accompanying drawings, in which:

Figure 3 is an enlarged fragmentary sectional view of a portion of the sleeve before assembly.

Figure 4 is a similar view after assembly.

Figure 5 is a view corresponding to Figure 3 showing a further form of the invention.

Figure 6 is a view corresponding to Figure 1 showing a further form of the invention.

Figure 1:
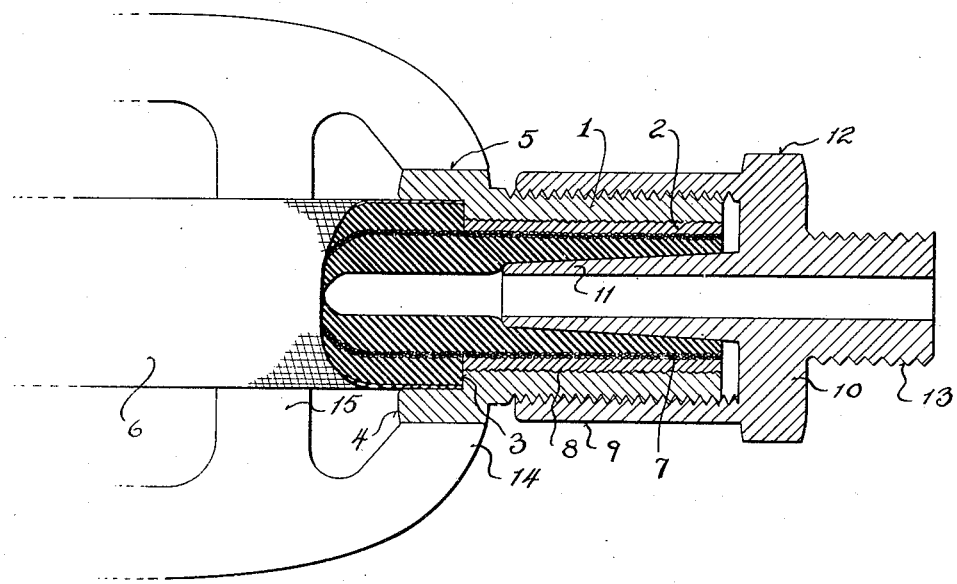
Figure 1 is a sectional view showing one form of the hose coupling in its assembled condition on the hose and showing a portion of a vice for holding the sleeve and the hose during assembly.

Referring to the drawings, it will be seen that the hose coupling comprises an externally threaded sleeve 1 which constitutes the main sleeve and which is provided with an inner sleeve 2 of soft, ductile material, preferably soft, ductile metal. The sleeve 1 is externally threaded and is provided with a shouldered portion 3 and with an extended or lip-like portion 4. The sleeve is provided with a plurality of faces 5 so that it may be gripped by a wrench or vice or other tool.

The sleeve is adapted to receive the end of the hose 6. The hose 6 is a high pressure, wire reinforced hose and has its end skived down to remove the outer coating down to the braided wires 7. The skived portion of the sleeve is, therefore, of reduced diameter and is inserted within the inner sleeve 2. The adjacent unskived portion of the hose is surrounded by the lip portion 4 which serves to protect the outer coating of the hose adjacent its end.

In the form of the invention shown in Figures 1 through 4, the soft, ductile, inner sleeve 2 is pressed into the main sleeve 1 and the main sleeve 1 is roughened interiorly. For example, it may be provided with fine, shallow threads as indicated at 8, see particularly Figure 3. When the soft, ductile, inner sleeve 2 is initially forced into the outer sleeve 1 it does not enter the threads but when the hose is expanded from its interior towards its exterior, as will be described hereinafter, the soft, ductile sleeve 2 is forced into the threads 8 as shown in Figure 4. In addition to this, it will be seen from Figure 4 that the inner surface of the inner sleeve 2 shapes itself to the wire braiding 7 of the hose 6 and thus interlocks with both the hose and the main sleeve 1.

The main sleeve 1 is adapted to be screwed into the bore of an internally threaded shell 9 which is provided with a rear wall or body portion 10 and with an internally located apertured nipple 11 which projects from the rear wall or body portion 10 inwardly of the shell 9 and which may be formed integrally with the shell or which may be formed as a separate member and screwed into the shell and swaged thereto in accordance with the well known practice. For the purpose of simplicity the integral nipple has been shown. The nipple 11 is coaxial with the shell 9 and is adapted to enter the bore of the hose 6 and to expand the hose from the interior outwardly so as to cause the wire braiding 7 of the stripped or skived portion of the hose to embed itself in the soft, ductile ring 8 and to cause such ring to embed itself in the threaded or roughened interior portion of the main shell 1 as shown in Figures 1 and 4.

The body portion 10 is provided with a plurality of flat faces 12 so that it may be gripped by a wrench and it may be provided with a male or female connecting portion 13, a male portion having been chosen for the purpose of illustration.

Figure 2:
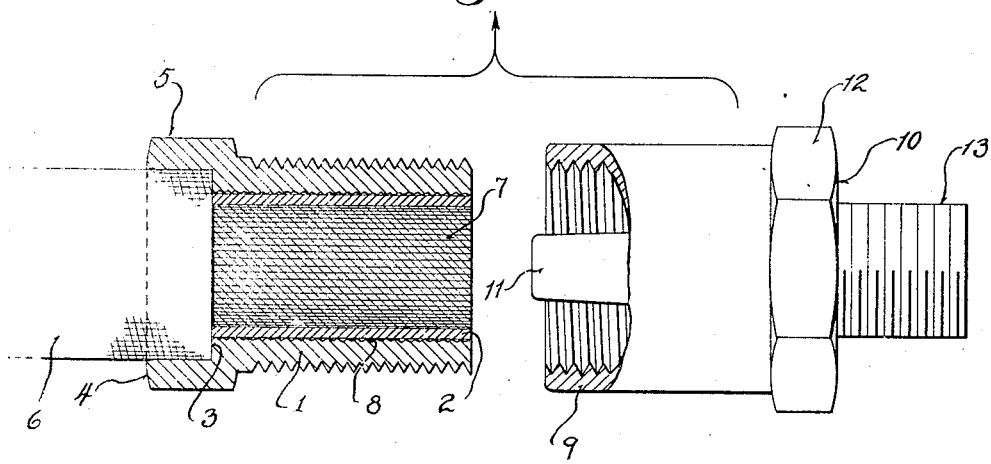
Figure 2 is a view showing the sleeve on the skived hose and showing the shell ready to be screwed onto the sleeve.

It is to be noted particularly that in assembling the hose coupling on a skived, wire reinforced hose that the main sleeve 1 together with its inner sleeve 2 is slipped over the skived end of the hose as shown in Figure 2 with the lip 4 overhanging and protecting the adjacent unskived portion of the hose 6. Thereafter the sleeve 1 and the hose 6 are gripped in a vice, the jaws thereof for gripping the sleeve and the hose being respectively indicated by the reference characters 14 and 15. If desired, the jaws 15 may be omitted.

While the sleeve and hose remain stationary, the tapered nipple 11 is received into the bore of the hose and the shell 9 is screwed onto the sleeve 1. In doing this, the effect is to draw the hose over the tapered nipple 11 as the shell is screwed in place, the hose due to its expansion being gripped by the composite sleeve formed of the main sleeve 1 and the ductile, soft, inner sleeve 2. The hose firmly gripped by the composite sleeve is, as stated, forced inwardly of the shell 9 and over the nipple 11 as the shell is screwed onto the sleeve.

The tapered nipple 11 is neither annularly barbed nor annularly fluted, nor is it threaded. It has a smooth exterior which will not damage the inner lining of the hose. It merely serves to expand the hose without damage to the hose. At the same time the pressure of the hose against the smooth exterior of the nipple 11 forms an excellent seal or joint and prevents leaking. In addition to this, as the pressure increases due to the expansion of the hose by the tapered nipple, the wire braiding embeds itself in the soft, ductile, inner sleeve 2 and also the soft, ductile, inner sleeve 2 is forced into interlocking relation with the roughened or interiorly threaded portion 8 of the main sleeve 1 as shown in enlarged section in Figure 4.

It is to be noted particularly that the screwing of the shell 9 onto the sleeve causes the composite sleeve 1, 2 to grip and drag the hose over the smooth nipple 11 which, in turn, expands the hose and causes intimate binding between the wire braiding of the hose and the composite sleeve.

It is distinctly understood that instead of forming the sleeve as a composite member it may be formed as a unitary structure and no soft, ductile ring 2 need be employed. In this event, the sleeve would have the same shape as that shown in Figure 1 but the portion 2 would be formed integrally with the sleeve and, if desired, the inner portion of the sleeve could be threaded or provided with annular grooves as is shown clearly in the form of the invention illustrated in Figure 6. At all events the sleeve would be provided with an overhanging lip portion 4, see Figure 2, which would serve to protect the unskived end of the hose and prevent the outer covering from becoming frayed or stripped off and the sleeve would draw the hose over the tapered nipple as previously described and the sleeve would interlock with the braided wire reinforcing of the hose.

It is obvious also that the composite sleeve may be formed as shown in Figure 5 in which the main sleeve is indicated by the reference character 1' and the soft, ductile, inner sleeve by the reference character 2'. In this case, the interior of the sleeve 1' is neither threaded nor roughened and the ductile sleeve 2' has a pressed fit with the main sleeve 1'.

The invention may take other forms. For example, as shown in Figure 6 the invention is also applicable to hoses which are not wire reinforced. These hoses may be solid rubber hoses or they may be provided with a plurality of fiber reinforcing braiding layers if desired. The hose is indicated by the reference character 16 in Figure 6 and it is slipped into the sleeve 17. The sleeve 17 is provided with flat faces 18 as previously described and is externally threaded. The sleeve is also internally threaded or provided with a plurality of annularly shaped barbs or rib-like portions 19 preferably of the shape shown in Figure 6. The sleeve is adapted to be slipped over the end of an unskived hose which, as stated, is preferably a hose without wire reinforcing.

The coupling includes a shell 20 which is internally threaded and which is provided with an end wall or body portion 21 having flat faces 22 adapted to be gripped with a wrench. It is provided with a tapered, apertured, coaxial nipple 23 which may be integral with the body portion or wall 21 or may be screwed and swaged therein according to the usual practice. The body portion is provided with a connecting portion which may be a male or female member. The connecting part is indicated by the reference character 24.

In assembling this coupling, shown in Figure 6, the sleeve 17 is passed over the end of an unskived hose 16 and the sleeve is gripped between a pair of vice jaws 25. Thereafter the nipple 23 is inserted into the hose and the shell 20 is screwed onto the sleeve. This causes expansion of the hose from its interior towards its exterior and causes the hose to engage and embed itself in the grooved portion 19 of the sleeve 17. The sleeve thus serves to drag or draw the hose over the nipple 23. It is to be noted particularly that the exterior surface of the nipple 23 is smooth and is tapered and will not damage the inner lining of the hose.

The hose shown in Figure 6 is adapted to withstand a lesser pressure from that shown in Figure 1. In both cases, however, it is to be noted that the sleeve draws the hose over the smooth expanding nipple and the expanding nipple causes the hose to tightly bind against and be gripped by the sleeve.

It is to be noted also that in the event leaking should develop when the hose is in service, that either form of the coupling may be tightened up to the extent required.

It is also to be noted that these couplings can be used over and over and are freely renewable. The fact that the soft, ductile, sleeve 2 interlocks with the main sleeve 1 as shown in Figure 4 does not prevent using the composite sleeve over and over as many times as need be.

It will be seen that very simple types of renewable couplings have been described and that these couplings may be very readily and easily applied to hoses. It is also to be noted that the couplings are of extreme simplicity and are consequently easy to manufacture.

Although this invention has been described in considerable detail, it is to be understood that such description is intended as illustrative rather than limiting, as the invention may be variously embodied and is to be interpreted as claimed.

I claim:

1. A hose coupling for a wire braided hose having an end portion skived down to the wire braiding, said hose coupling comprising an externally threaded sleeve including an outer sleeve and a ductile inner sleeve arranged to engage the wire braiding of the hose and having a portion of the outer sleeve arranged to surround the adjacent unskived part of the hose, and an internally threaded shell having an end wall, and a smooth apertured tapered nipple carried by the end wall and arranged to enter the bore of the hose as said shell is screwed onto said sleeve, said nipple being arranged to expand the hose while the shell is screwed onto said sleeve and to force the wire braiding into embedded relation with said ductile inner sleeve.

2. A hose coupling for a wire braided hose having an end portion skived down to the wire braiding, said hose coupling comprising an externally threaded sleeve including an outer sleeve and a ductile inner sleeve arranged to engage the wire braiding of the hose and having a portion of the outer sleeve arranged to surround the adjacent unskived part of the hose, and an internally threaded shell having an end wall, and a smooth apertured tapered nipple carried by the end wall and arranged to enter the bore of the hose as said shell is screwed onto said sleeve, said nipple being arranged to expand the hose while the shell is screwed onto said sleeve and to force the wire braiding into embedded relation with said ductile inner sleeve, said outer sleeve having interiorly located means adapted to interlock with said ductile inner sleeve when the hose is expanded by said tapered nipple.

RAYMOND J. HALLISY.

REFERENCES CITED

The following references are of record in the file of this patent:

UNITED STATES PATENTS

| Number | Name | Date |
|---|---|---|
| 1,886,807 | Heidloff | Nov. 8, 1932 |
| 2,019,540 | Mascuch | Nov. 5, 1935 |
| 2,273,398 | Couty et al. | Feb. 17, 1942 |
| 2,278,239 | Butler | Mar. 31, 1942 |
| 2,328,819 | Leubkeman | Sept. 7, 1943 |
| 2,388,992 | Pape et al. | Nov. 13, 1945 |

FOREIGN PATENTS

| Number | Country | Date |
|---|---|---|
| 19,920 | Great Britain | Sept. 20, 1898 |